June 21, 1949.        O. L. GARRETSON        2,473,704
HOSE CONNECTOR AND VALVE
Filed Oct. 1, 1947
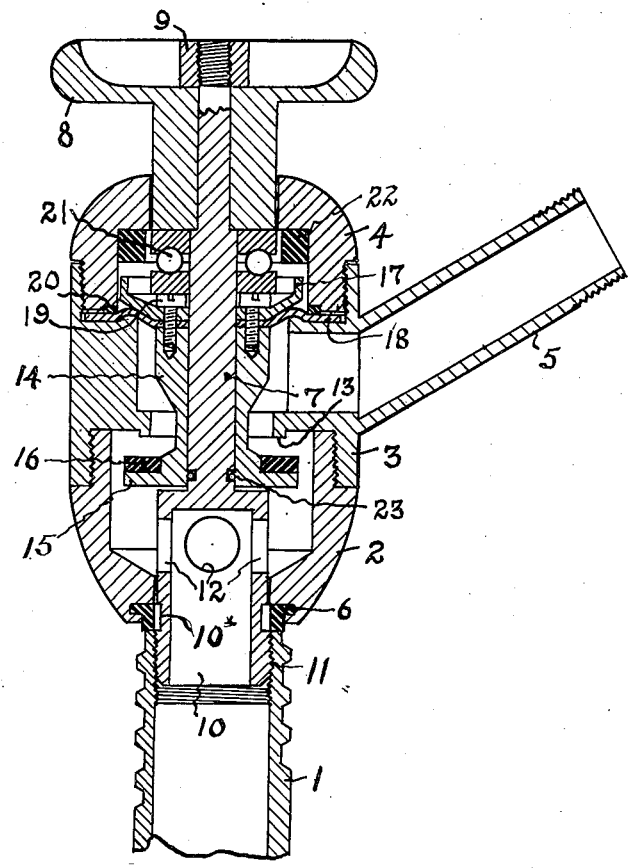
INVENTOR.
Owen L. Garretson.
BY
Darby & Darby.
Att'ys.

Patented June 21, 1949

2,473,704

UNITED STATES PATENT OFFICE 2,473,704

HOSE CONNECTOR AND VALVE

Owen L. Garretson, Roswell, N. Mex., assignor to Phillips Petroleum Company, a corporation of Delaware Application October 1, 1947, Serial No. 777,249

9 Claims. (Cl. 284—17)

This invention relates to a combined hose connector and valve for use in filling containers, as for example storage and transportation containers for liquid petroleum gas.

The broad object of this invention is to provide in a single unit a device by means of which the delivery or supply hose through which the container is filled is attached to the container and a valve which sequentially opens after complete attachment to the container and through which valve the container is filled.

Another object of the invention is to provide a relatively simple structure combining these functions which is easily utilized, inexpensive to manufacture, easy to maintain, and rugged in use.

Other and more detailed objects of the invention will be apparent from the following description of the embodiment thereof illustrated in the attached drawings.

This invention resides substantially in the combination, construction, arrangement and relative location of parts, all as will be described in detail below.

In the accompanying drawing, the single figure is a vertical, central, cross-sectional view showing one form of the invention.

The more common practice at the present time in filling liquid petroleum gas containers is to provide as separate parts a valve for the supply or delivery hose and a coupling device by means of which the valve is attached to the container. The device of this invention, as will be explained in greater detail hereinafter combines both of these structures in a single unit facilitating the connection and disconnection of the hose to the container, and simplifies the filling of the container by the use thereof.

In the accompanying drawings, at 1 is illustrated the connector which forms part of the storage and transportation container for liquid petroleum gas. The unit of this invention consists of a body composed of the parts, 2, 3 and 4, threadedly connected together in the manner clearly illustrated. Each of these parts contains a cavity or central opening which together form the space defined by the housing composed of the parts, 2, 3 and 4. The part 3 is provided with a tubular extension 5 at the end of which the delivery or supply hose is attached in any suitable manner, as for example by means of a threaded coupling.

A shaft 7 is provided with a handwheel 8 and a nut 9 for securing them together in the particular structure illustrated.

Attached to or integral with the shaft 7 is a tubular extension 10 having threads 11 on the exterior thereof for connection with the threads on the interior of the connector 1. This tubular extension is provided with a series of openings 12 which open into the space within the unit body. The body portion 3 is shaped to provide an annular seat 13 around the central passage through the bottom wall thereof.

A valve body member 14 has a sliding fit with the shaft 7 and has an annular disc-like head 15, on a recess on the upper face of which is secured a sealing gasket 16 for cooperation with the seat 13. A flexible diaphragm 18 of suitable material is clamped between the body portions 3 and 4 to form a seal at this point. In order to effect a still better seal an auxiliary sealing ring 20 is recessed in the end edge of the housing part 4 and is clamped down onto the diaphragm 18 to insure against the leakage of gas around the periphery of the diaphragm. The diaphragm is provided with a central opening and is clamped to the valve body member 14 by means of a cup-shaped disc 17 and the screws 19. This prevents the leakage of gas around the valve stem at the diaphragm. Interposed between the shoulder formed by the handwheel and the screws 19 is a ball thrust bearing 21. Mounted in the housing part 4 is an annular sealing gasket 22 adapted to form sealing engagement with the upper edge of the cup-shaped member 17. Interposed between the shaft 7 and the valve disc body member 14 is a sealing ring 24 of suitable and well known construction for preventing the escape of gas around the shaft 7 while allowing for relative rotational movement of the shaft in the body member 14.

As is clear from the drawing, the unit comprising the members 14, 15, 17 and 18 forms a substantially tight fit between the enlarged tubular extension 10 and the shoulder formed by the handwheel 8.

In the use of this device, assuming that the delivery hose is connected to the extension 5 and to the source of fluid pressure, it will be seen that the fluid under pressure will enter the housing of the unit and force the diaphragm 18 upwardly sealing the opening defined by the seat 13 by engagement of the sealing gasket 16 therewith and sealing the upper end of the housing by the engagement of the upper end of the cup-shaped member 17 with the sealing gasket 22. Of course, the unit is designed so that the exposed area of the diaphragm 18 is larger than the exposed area of the valve disc 15. Thus the pressure of the pressure fluid will normally seal off the delivery hose and prevent the loss of fluid.

When it is desired to fill the container the unit is aligned with the container connector 1 so that threads 11 engage. Handwheel 8 is rotated causing these threads to telescope until the end of the connector forms a seal with the gasket 6 mounted in the lower end of the housing part 2. It is contemplated that the device will be designed so that about four turns of the handwheel will cause a seal between the members 1 and 6. Two additional turns of the handwheel will then pull the entire movable assembly downward as the threads 11 further engage, causing gasket 16 to leave the seat 13 connecting the delivery hose with the interior of the container through the openings 12. The thrust bearing 21 insures ease in turning the handwheel during the period of unseating the valve.

When the container is full the first two reverse turns of the handwheel will permit valve 15 to reseat and the last four turns will disconnect the unit from the connector 1.

On consideration it will be seen that the turns of the handwheel subsequent to the engagement of gasket 6 with the end of the connector 1 will cause all the movable parts of the valve to move longitudinally as the rotatable parts thereof turn. It is this longitudinal movement which causes valve 15 to unseat. When the device is disconnected pressure from the source will reassert itself on the diaphragm 19 to hold the valve 15 seated. Thus no fluid may escape when the device is not in use.

The outer peripherial groove 10' on the tubular extension 10 comprises the usual "weakness ring" provided for the purpose of permitting the connector valve to be broken away cleanly from the cylinder filling valve in the event of an accident occurring while the two are connected together. The construction of the valve is such that it will then close as will the check valve, not shown, in the cylinder filling valve to prevent excessive loss of fluid.

It is at once apparent that this structure may be used with both liquids and gases and may have many uses in addition to the one described herein.

It is also clear that changes in the details of construction can be effected without departing from the novel subject matter herein disclosed. I do not, therefore, desire to be limited to the single embodiment used for purposes of illustration, but rather by the claims granted me.

What is claimed is:

1. A combined connector and valve comprising a housing having an apertured inner wall dividing the housing into two compartments, said aperture being defined by a valve seat, a pressure fluid connection to said housing on one side of said wall, a manually operable shaft extending through said housing and having a threaded end extending exteriorly of said housing, a valve disc slidably mounted on said shaft, and a diaphragm sealed in said housing and connected to said valve disc, said diaphragm being exposed to pressure fluid.

2. In the combination of claim 1, said housing having a sealing gasket mounted on the end thereof and surrounding said threaded extension.

3. In the combination of claim 1, means for forming a fluidtight seal between said valve disc and shaft.

4. In the combination of claim 1, means for forming a fluidtight seal between said valve disc and shaft, comprising a sealing member lying therebetween.

5. In the combination of claim 1, means for forming a fluidtight seal between said valve disc and shaft comprising an O-ring seal mounted in said housing and cooperating with said valve disc.

6. A combined connector and valve comprising a housing forming a chamber, an apertured wall forming part of said housing and dividing said chamber into pressure and exhaust compartments, said aperture being defined by a valve seat, a pressure fluid connection to said pressure chamber, a flexible diaphragm in said pressure chamber, a manually operable shaft having a threaded end extending exteriorly of said housing, and a member having a valve disc slidably mounted on said shaft and connected to said diaphragm, said valve disc cooperating with said valve seat to seal said pressure chamber.

7. In the combination of claim 6, a thrust bearing interposed between said shaft and said member.

8. In the combination of claim 6, a sealing gasket mounted on the end of said housing and surrounding said threaded extension.

9. In a combined connector and valve member, a body member formed to provide a pressure and an exhaust chamber connected by a passage defined by a valve seat, said body member having an opening into said exhaust chamber, a shaft rotatably mounted in said body member and having an aperture threaded extension exposed through said opening, a gasket secured to said body member so as to surround said extension, a valve disc member slidably mounted on said shaft and a diaphragm sealed in said housing and to said member to form one wall of said pressure chamber, and a fluid pressure supply connection to said pressure chamber.

OWEN L. GARRETSON.

No references cited.